July 16, 1929.

W. G. WILSON 1,721,326

SEALING OR LOCKING RING

Filed April 24, 1926

Inventor
Wylie G. Wilson
James L. Stewart
By
Attorney

Patented July 16, 1929.

1,721,326

UNITED STATES PATENT OFFICE.

WYLIE G. WILSON, OF JERSEY CITY, NEW JERSEY, ASSIGNOR TO WILSON RINGS COMPANY, OF JERSEY CITY, NEW JERSEY, A CORPORATION OF NEW JERSEY.

SEALING OR LOCKING RING.

Application filed April 24, 1926. Serial No. 104,446.

This invention is a new article of manufacture, and, more particularly, a sealing or locking ring adapted for general application in the several arts where a seal or lock is required.

Heretofore seals or locks have been produced through the employment of elements which are either rigid or permanently deformable. For example, in the locking of parts together, it has been the practice to use rigid keys, rigid parts bolted together, and analogous rigid structures, while in the production of seals it is the common practice to produce a seal by the use of materials, such as rubber, asbestos and plastic materials, which initially serve the purposes, in many instances, but rapidly deteriorate in use.

In both locks and seals, as heretofore produced, the vibration and changes incident to temperature and movement of cooperating parts, all join in causing a "working" which results in lost motion or leakage at the connection. Furthermore, it is not practical to repetitively use locking and sealing elements of the prior art, as their characteristics are not adapted for such purpose. Frequent inspection, repairs and replacements are necessary with all such devices.

With these considerations in mind, the object of the present invention is to provide a locking or sealing ring which may be employed either to produce a tight lock or a liquid impervious seal and to so constitute such ring that it is capable of effectually performing its functions through long periods of repetitive use and under operating conditions, where under the structures of the prior art they become ineffective after a relatively short period.

Generally speaking, the ring of this invention is of annular composite frusto conical form. It embodies two coaxial hollow frustums constituting the inner and outer frustums of the ring and spaced apart by one or more coaxial hollow frustums integrally united with the inner and outer frustums and with each other to form a unitary structure. That is to say the several frustums are successively integrally united at their respective peripheries to form a composite section.

By a hollow "frusto conical section", I mean a frusto conical section which is hollowed out to provide a frusto conical shell.

I have discovered that a ring of this composite form will function with remarkable efficiency in the formation of repetitive seals or locks when constructed from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate", such as leather, asbestos, soft rubber, soft metals, etc.

The obdurate materials, when employed pursuant to this invention, are operable within their elastic limit by which I mean that, when embodied in the form of a ring, as described, and placed under stresses which tend to deform the ring, incident to producing a seal or lock, the ring shall retain a positive tendency to resume its original form when the stresses are relieved.

I have discovered that if a ring of unbroken composite hollow frusto conical section is placed under axial compression which tends to flatten it, the outer periphery of the composite section will expand cross axially and its inner periphery will cross axially contract, to bring both of said peripheries into engagement with suitable cooperating seats or abutments for cooperation therewith in a sealing or locking function.

"Unbroken", as used above, may be defined as peripherally continuous; i. e., not slotted or formed into fingers.

By "axial compression", I mean pressure exerted upon the ring in a direction coaxial with or parallel to its axis, whereby its altitude is diminished and the peripheral diameter of its base increased.

Attention is particularly directed to the fact that the stressing of the obdurate ring must be within the elastic limit thereof; otherwise said ring would not tend to resume (i. e., tend to spring back to) its normal form. Only a ring in the sense of this invention composed of obdurate material and of substantially hollow frusto conical configuration will thus properly function.

The term "elastic limit", as employed in the specification and claim of this application, is so employed to designate that quality or characteristic of the composite frusto conical ring of obdurate material employed which, when compressed within predetermined limits and then relieved of such compression, will cause said conical form to tend to return to approximately its original form and size. It is intended that such compression shall be within and not beyond the tendency of the ring to return to its original form and size. That is to say, it is intended that the degree of axial pressure employed shall not be sufficient to break down and destroy the resilient or reactive quality of the composite frusto conical form herein described. On the contrary, it is the purpose in practicing this invention that the degree of compression employed shall be limited to a degree where such reactive characteristics of said ring will not be seriously affected.

For a better understanding of the operation of the composite frusto conical ring of this invention, it is suggested that each of the hollow conical sections which enter into its construction functions like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, becomes less and less.

The ring of the present invention may be considered as functioning like a multiplicity of toggles; that is to say, there is a multiple toggle-like action in each diametric plane, and, obviously, there is an infinite number of toggles. When the ring is compressed axially, the dimensions of the ring and the proportioning of the obdurate material of which it is composed, bring about, within said ring, the steadily increasing functional characteristics incidental to toggle action. This action results in a cross axial or radial movement of the ring until its peripheries are forced into tight sealing or locking engagement with cooperating seats or abutments. The obdurate ring, in either case, is so dimensioned and proportioned that the seal or lock is effected, in the manner described, before the elastic limit of the ring is reached. Accordingly, upon release of the stresses incident to producing the seal or lock, the ring tends to autogenously, i. e., automatically, break such seal or lock.

In practice, the parts between which a seal or lock is to be effected are provided with suitable compression abutments adapted to engage with the upper and lower surfaces of the ring and are relatively adjustable in order that the ring may be placed under axial compression, and said parts are moreover further provided with suitable resisting abutments with which the inner and outer peripheries of the ring are adapted to cooperate in the production of a seal or lock.

The ring of this invention can be employed for a great variety of uses, and the particular formation of the pressure abutments and resisting abutments will of course vary in accordance with the particular environment in which the invention is employed, and I do not therefore limit the invention so far as these particular abutments are concerned. It is sufficient in practice that the invention be employed with some means to place the ring under axial compression, and with some means to withstand the cross axial expansion and contraction of the ring as is necessary to produce the seal or lock.

In practically carrying out the invention, the ring may be cast, molded, wrought or cut from a solid ring into the desired section, or the several frusto conical sections may be made separately and thereafter assembled and joined together to produce the composite section described. I find it entirely practical, however, for many of the uses to which this invention is susceptible, to stamp and form the ring from a sheet metal blank by cutting and forming dies and the sheet metal may be subjected to suitable tempering or heat treatment for the purpose of imparting thereto the obdurate characteristics to which I have referred. This mode of making the ring of the invention is very economical and the resulting ring is highly efficient and practical in the performance of its intended functions.

Features of the invention, other than those adverted to, will be apparent from the hereinafter detailed description and claim, when read in conjunction with the accompanying drawings.

The accompanying drawings illustrate one practical embodiment of the invention, but the construction therein shown is to be understood as illustrative, only, and not as defining the limits of the invention.

Figure 1:
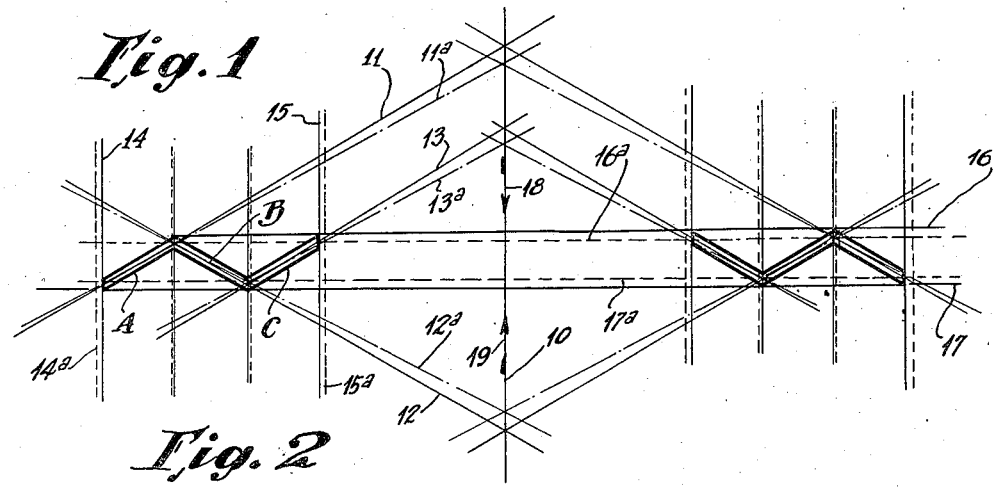
Figure 1 is a diagrammatic view showing the ring in central section and illustrating the specific formation of the ring and the principle underlying its mode of operation.

In Figure 1 of the drawing, I have illustrated the cross section of the ring diagrammatically in order that the several well defined surfaces of the ring may be clearly apparent and to further permit of a clear description of the mode of operation of such ring.

The ring of Figure 1 is composed of three frusto conical sections A, B and C which have a common axis 10. The frustum A forms part of a virtual cone 11. The frustum B forms part of the virtual cone 12, and the frustum C forms part of the virtual cone 13. The frustum A may be referred to as the outer frustum, the frustum C the inner frustum, and the frustum B the intermediate frustum. As shown in Figure 1, all of these frustums are of the same altitude and are of successively smaller diameters with the inner periphery of the frustum A integrally united with the outer periphery of the frustum B and the inner periphery of the frustum B integrally united with the outer periphery of the frustum C.

The outer periphery of the ring, i. e., the outer edge of the frustum A, embodies part of a cylindrical surface 14 and the inner periphery of the ring, i. e., the inner periphery of the frustum C, embodies a portion of the cylindrical surface 15 which is coaxial with the surface 14. Inasmuch as all of the frustums have the same altitude, the upper edges of the ring lie in the plane 16, while the lower edges of the ring lie in the plane 17, both of these planes being cross axial and parallel with one another.

The parts, as thus far defined, relate to the normal condition of the ring, i. e., that condition wherein the ring is in unstressed, neutral form.

In using the ring of the present invention, it is adapted to be placed under axial compression as indicated by the arrows 18 and 19 in order to bring about a cross axial expansion of the ring at its outer periphery and a cross axial contraction of the ring at its inner periphery.

Figure 4:
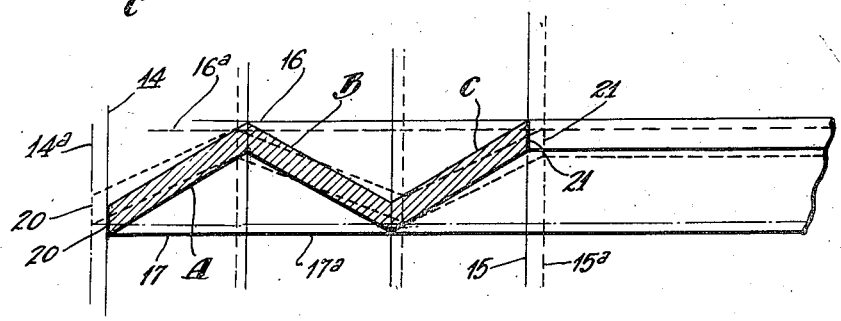
Figure 4 is a diagrammatic radial section of the ring illustrating the same on an enlarged scale and showing the movement of the different portions of the ring when subjected to axial pressure.

When pressure is applied as indicated by the arrows 18 and 19, for the purpose of placing the ring under axial compression, this pressure brings about a decrease in the altitude of all of the virtual cones simultaneously as indicated at 11ª, 12ª and 13ª in Figure 1, and is accompanied by a corresponding decrease in the axial dimension of the ring so that the planes 16 and 17 of the upper and lower edges of the ring are brought closer together as indicated by the dotted lines 16ª and 17ª in this figure. This axial decrease of the altitude of the virtual cones brings about within the several frusto conical sections a change which results in a cross axial expansion of the cylindrical surface 14 from the full line position of Figure 1 to the dotted line position 14ª in this figure. Accompanying this action, the inner peripheral surface 15 of the ring is contracted as indicated at 15ª. Thus, when the axial dimension of the ring is decreased, its outer periphery is expanded and its inner periphery contracted. The manner in which this is brought about is clearly exhibited in Figure 4 on enlarged scale, the dotted line position indicating the stressed condition of the ring, and the full line position the normally unstressed condition of the parts.

It should be understood, as heretofore stated, that the ring is of obdurate material and that the pressure applied, as designated by the arrows 18 and 19, should be sufficient to effect the desired degree of stressing, but should at no time be sufficiently great to stress the ring beyond its elastic limit, since it is important that when the axial pressure is relieved, the inherent obdurate characteristics of the ring should bring about or tend to bring about a return of the ring to its normal unstressed form.

Figure 2:
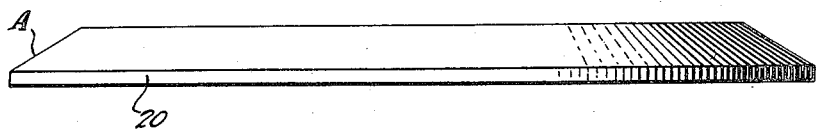
Figure 2 is a side elevation of the ring.
Figure 3:
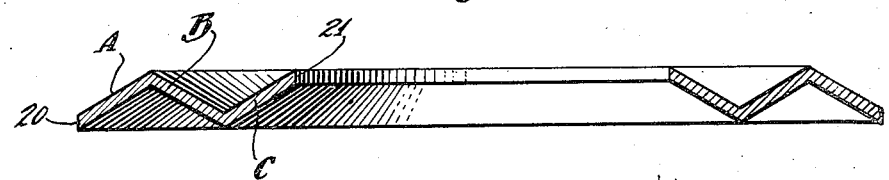
Figure 3 is a transverse section of the structure shown in Figure 2.

In Figures 2 and 3, I have illustrated the preferred practical form of the ring showing the same as embodying three integrally associated hollow frusto conical sections. I wish it understood, however, that more than three sections may be introduced into the ring construction by simply adding frusto conical sections to the inner or outer periphery of the ring as may be desired for the particular use to which the ring is to be adapted.

From Figures 2 and 3, however, it will be noted that the ring is provided with a cylindrical outer periphery 20 and a coaxial cylindrical inner periphery 21.

In practice, I find it convenient to stamp the ring from sheet metal and form it into the desired number of integral frusto conical sections by the employment of suitable forming dies. If the metal from which the ring is constructed does not possess the desirable obduracy, it may be heat treated or tempered as occasion may require.

The ring which I have described is of pronounced practical value and utility. The tendency of the several frusto conical sections in a ring of obdurate material to autogenously return or tend to return to their original form after compression is of primary importance. As previously stated, this retraction does not necessarily involve a return of the ring to exactly the same form, but to approximately that same form when considered from a practical standpoint. Such a tendency to return or spring back satisfies the practical requirements of the invention.

The resulting quality of the obdurate material from which the ring is made thus lends itself to repeated action and reaction through an extended period of operation, in any one of the several environments in which it is adapted for use.

The foregoing detailed description sets forth the invention in its preferred practical form, and the invention is to be understood as fully commensurate with the claim.

Having thus fully described the invention, what I claim as new and desire to secure by Letters Patent is:

As a new article of manufacture, a sealing or locking ring of obdurate material embodying at least three coaxial hollow conical frustums of successively greater diameter, all of which are of the same altitude and which frustums are consecutively peripherally integral to form a ring of composite hollow frusto conical cross section, the inner periphery of the innermost frustum and the outer periphery of the outermost frustum being in the form of coaxial cylindrical surfaces.

Signed by me at Jersey City this 21st day of April, 1926.

WYLIE G. WILSON.